(12) United States Patent
Swales et al.

(10) Patent No.: US 8,226,525 B2
(45) Date of Patent: Jul. 24, 2012

(54) ENGINE STARTING CONTROL APPARATUS AND METHOD FOR A HYBRID VEHICLE

(75) Inventors: Shawn H. Swales, Canton, MI (US); Hong Yang, Rochester Hills, MI (US); Antonio E. Bartolomeo, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 462 days.

(21) Appl. No.: 12/551,592

(22) Filed: Sep. 1, 2009

(65) Prior Publication Data
US 2011/0053733 A1  Mar. 3, 2011

(51) Int. Cl.
- B60K 1/02 (2006.01)
- B60W 10/04 (2006.01)
- F02N 11/08 (2006.01)

(52) U.S. Cl. .... 477/3; 180/65.285; 701/113; 123/179.4; 123/192.1

(58) Field of Classification Search ................... 477/5, 3; 903/905, 906, 902, 930
See application file for complete search history.

(56) References Cited

U.S. PATENT DOCUMENTS

| | | | |
|---|---|---|---|
| 7,133,764 B2 * | 11/2006 | Kassner | 701/112 |
| 8,100,000 B1 * | 1/2012 | Rankin | 73/114.77 |
| 2003/0037767 A1 * | 2/2003 | Breitegger et al. | 123/406.58 |
| 2004/0255904 A1 * | 12/2004 | Izawa et al. | 123/352 |
| 2005/0263138 A1 * | 12/2005 | Sheikh et al. | 123/476 |
| 2007/0049456 A1 * | 3/2007 | Shimizu et al. | 477/3 |
| 2008/0182698 A1 * | 7/2008 | Matsubara et al. | 475/151 |
| 2008/0275611 A1 * | 11/2008 | Snyder | 701/51 |
| 2008/0275624 A1 * | 11/2008 | Snyder | 701/104 |
| 2009/0112412 A1 * | 4/2009 | Cawthorne et al. | 701/54 |
| 2009/0229897 A1 * | 9/2009 | Yutani et al. | 180/65.28 |
| 2009/0256513 A1 * | 10/2009 | Ando et al. | 318/478 |

OTHER PUBLICATIONS

Tomura et al., Development of Vibration Reduction Motor Control for Series-Parallel Hybrid System, SAE Technical Paper Series 2006-01-1125, Apr. 3-6, 2006, 2006 SAE World Congress, Detroit, MI USA.

Ito et al., Hybrid Transmission Development for AWD Luxury Cars, SAE Technical Paper Series 2007-01-4122, Oct. 29-Nov. 1, 2007, Powertrain and Fluid Systems Conference & Exhibition, Rosemont, IL USA.

* cited by examiner

*Primary Examiner* — David D Le
*Assistant Examiner* — Lillian Nguyen
(74) *Attorney, Agent, or Firm* — Quinn Law Group, PLLC

(57) ABSTRACT

A hybrid powertrain includes an engine having a crankshaft, and a hybrid transmission having an input member, an output member, and at least one motor/generator operable to provide or receive torque. A damper connects the crankshaft with the input member. A bi-directional rotational position sensing system operatively connects with either the crankshaft or an input side of the damper, and is configured to sense the rotational position and direction of the crankshaft, and provide a position signal indicative thereof. At least one controller is configured to receive the position signal and to provide a torque command to the motor/generator based at least in part on the position signal. The torque command is operable to cause the motor/generator to substantially cancel an expected engine torque pulse associated with the sensed rotational position during starting of the engine with the damper open. A method for controlling the hybrid powertrain is provided.

16 Claims, 5 Drawing Sheets

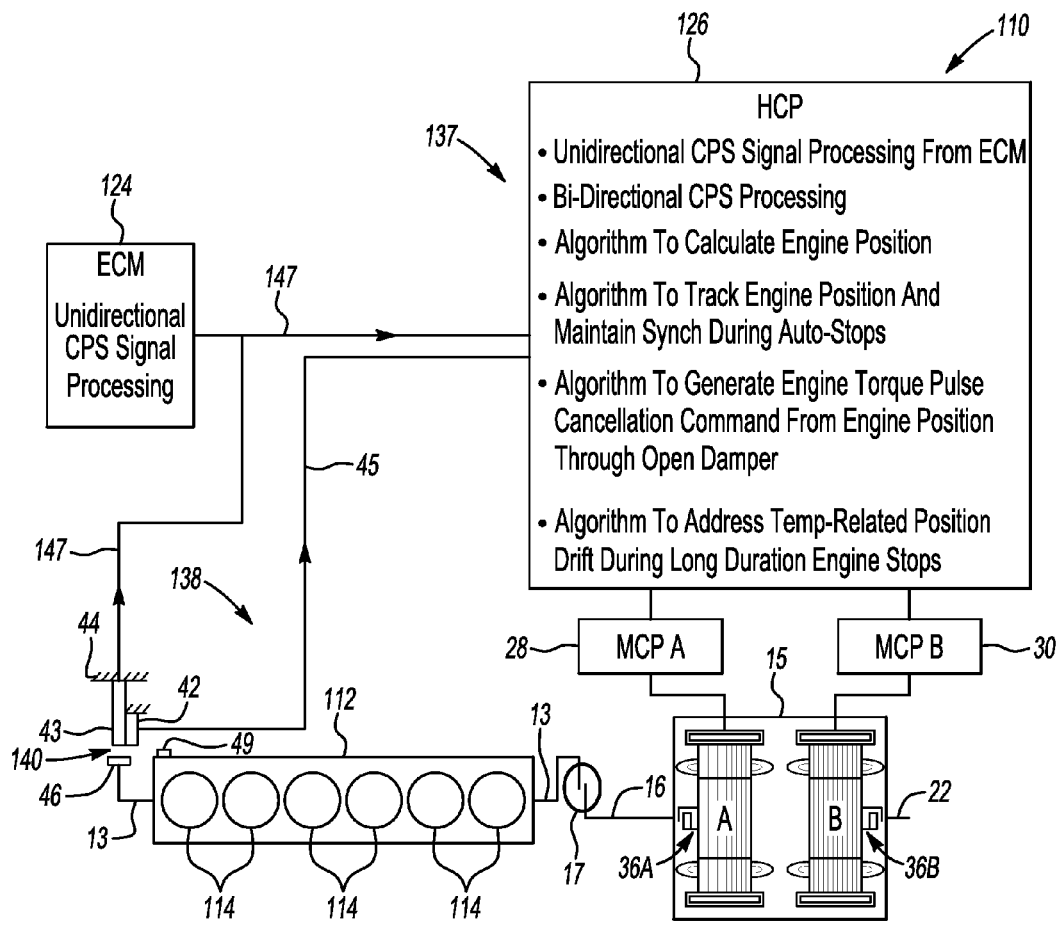
*Fig-2A*
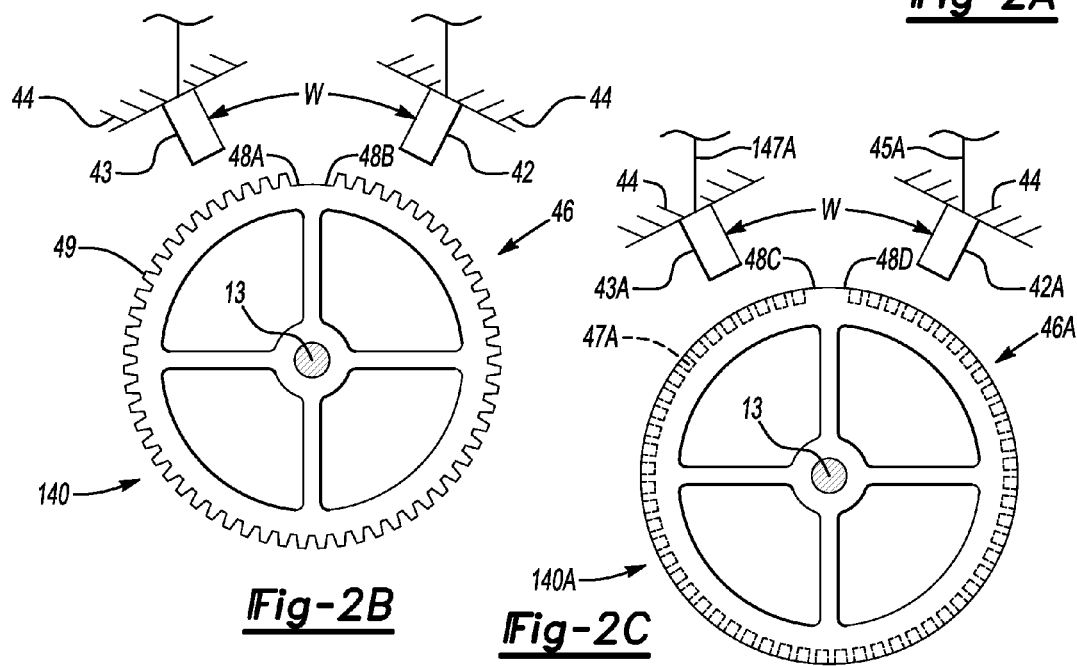
*Fig-2B*  *Fig-2C*

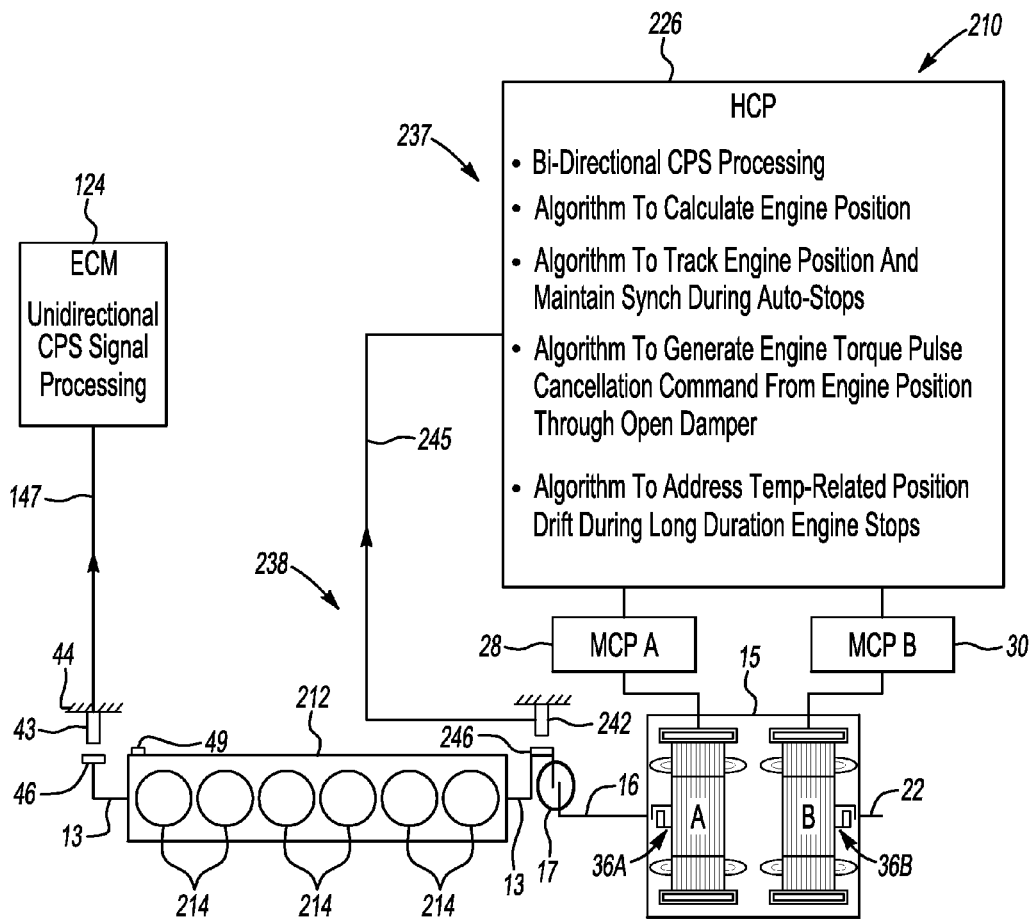
Fig-3A
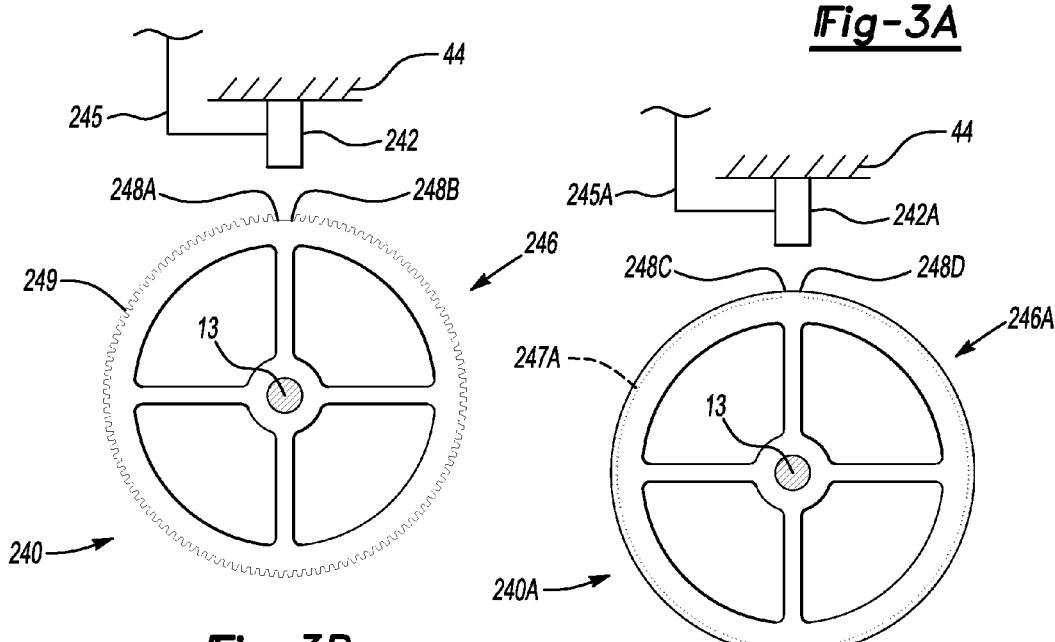
Fig-3B
Fig-3C

ENGINE STARTING CONTROL APPARATUS AND METHOD FOR A HYBRID VEHICLE

TECHNICAL FIELD

The invention relates generally to a control apparatus and method for an engine on a hybrid vehicle, and specifically to an apparatus and method for cancelling engine torque pulses.

BACKGROUND OF THE INVENTION

Vehicles with hybrid powertrains are able to shutoff the engine, and rely on torque supplied solely from one or more motor/generators in certain operating modes, thus improving fuel economy. When operating conditions require positive engine torque, the engine is restarted by a hybrid electronic controller in what is referred to as an autostart. A damper is often used in the driveline connection between the engine and the transmission to reduce vibration., filtering out high-frequency engine torque oscillations while transferring engine torque. Some hybrid powertrains also employ torque pulse cancellation, energizing a motor-generator to oppose excessive driveline vibrations caused by engine cranking and cylinder firing events. Other hybrid powertrains utilize a damper bypass clutch (DBC) which is engaged during an engine autostart, in order to bypass the damper to avoid vibrations caused by the damper encountering its natural frequency during that range of speeds, to prevent engine torque pulses from being conveyed to the transmission. The DBC is released during normal operation, restoring the damper function.

Torque pulse cancellation requires knowledge of the position of the engine crankshaft. Crankshaft sensors are typically unidirectional in that they cannot discern the direction of rotation of the crankshaft. As the engine slows to a stop, a reversal in the direction of rotation is common. With a unidirectional sensor, travel past position indicators, such as missing teeth or missing magnetic poles is necessary once in forward and once in reverse before an accurate estimation of crankshaft position can be determined from the sensor information. However, direction reversals may not always occur through the missing teeth/pole area. Thus, position errors occur when travel in the reverse direction is accumulated by the sensor as travel in the forward direction. Thus, even if the previous stop position is stored in the controller, it may not accurately reflect the position of the crankshaft.

SUMMARY OF THE INVENTION

An engine starting control apparatus and method are provided that significantly cancel engine torque pulses during engine starting without requiring a DBC, i.e., by allowing torque to flow from the engine to the transmission through an open damper. Specifically, a hybrid powertrain is provided that includes an engine having a crankshaft, and a hybrid transmission having an input member, an output member, and at least one motor/generator operable to provide or receive torque. A damper connects the crankshaft with the input member. Preferably, no bypass clutch is provided for the damper, decreasing the axial length of the powertrain, and reducing hydraulic requirements, thereby potentially increasing fuel economy while decreasing costs. A bi-directional rotational position sensing system operatively connects with either the crankshaft or an input side of the damper, and is configured to sense the rotational position and direction of the crankshaft, and provide a position signal indicative thereof. At least one controller is configured to receive the position signal and to provide a torque command to the motor/generator based at least in part on the position signal. The torque command is operable to cause the motor/generator to substantially cancel an expected engine torque pulse associated with the sensed rotational position during starting of the engine with the damper open (i.e., not by-passed).

A method for controlling the hybrid powertrain with an open damper as described above includes sensing the rotational position and direction of the engine crankshaft with a bi-directional position sensor, and providing a torque command to the at least one motor/generator that is configured to cancel an expected engine torque pulse occurring during starting of the engine. The expected engine torque pulse is based on the sensed rotational position and direction.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2A is a schematic representation of a second embodiment of a hybrid powertrain with a second embodiment of a torque pulse cancellation system having rotational position sensing system with both a unidirectional and a bi-directional sensing element;

FIG. 2B is a front view of a bi-directional rotational position sensing system of the powertrain of FIG. 2A;

FIG. 2C is a front view of an alternate bi-directional rotational position sensing system for use in the powertrain of FIG. 2A;

FIG. 3A is a schematic representation of a third embodiment of a hybrid powertrain with a third embodiment of a torque pulse cancellation system having both a unidirectional and a bi-directional rotational position sensing system;

FIG. 3B is a front view of the bi-directional rotational position sensing system shown in FIG. 3A;

FIG. 3C is a front view of an alternate bi-directional rotational position sensing system for use in the powertrain of FIG. 3A;

DESCRIPTION OF THE PREFERRED EMBODIMENTS

Figure 1A:
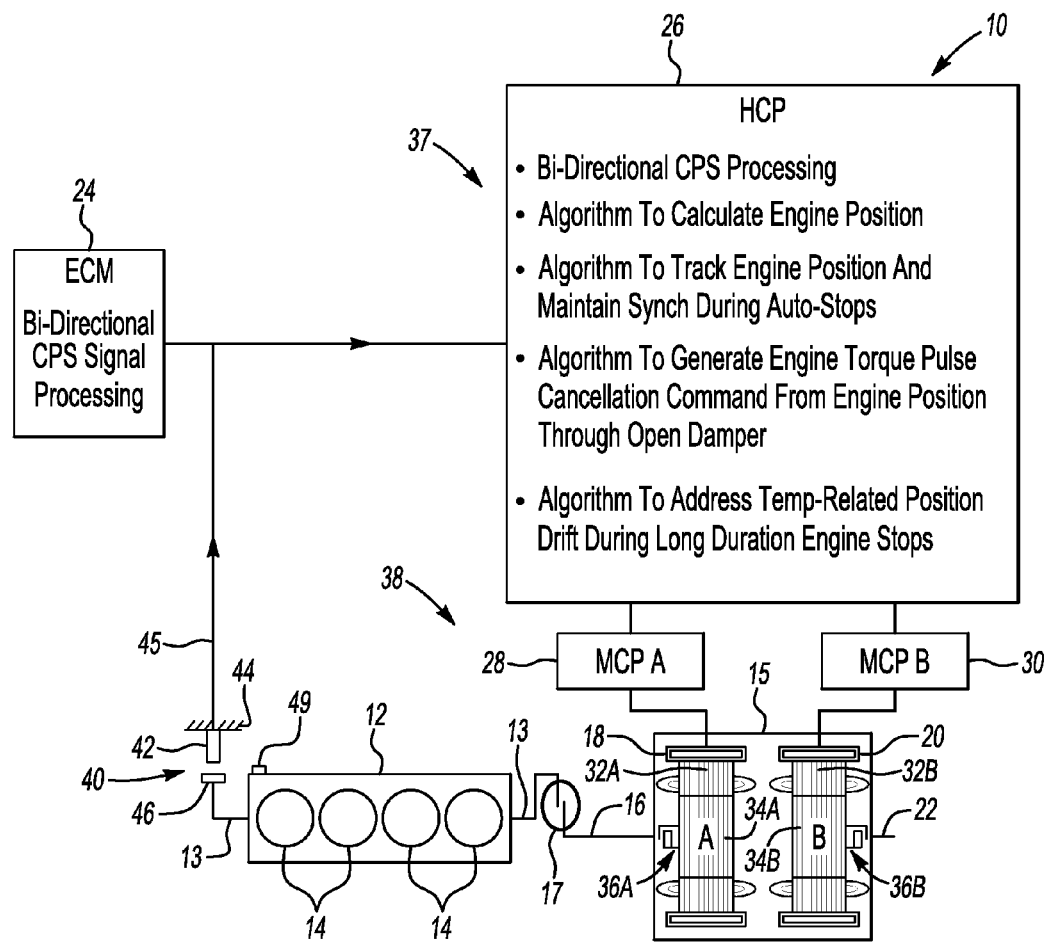
FIG. 1A is a schematic representation of a first embodiment of a hybrid powertrain with a first embodiment of an engine torque pulse cancellation system.

Referring to the drawings, wherein like reference numbers refer to like components, FIG. 1A shows a powertrain 10 with an engine 12 having a crankshaft 13, and a plurality of cylinders 14 in which combustion occurs to turn the crankshaft 13. Although four cylinders are shown, the engine 12 may have four, six, eight, or any other number of cylinders 14. The powertrain 10 includes a transmission 15 operatively connected to provide driving traction to vehicle wheels, not shown. The crankshaft 13 is operatively connected to an input member 16 of the transmission 15 through a damper 17. Notably, there is no bypass clutch for the damper 17. In other embodiments, such as if retro-fitting an existing hybrid platform with the torque pulse cancellation system described herein, a bypass clutch may be provided; however, with the torque pulse cancellation system and method described below, the bypass clutch is not necessary during autostarts, thus decreasing axial length of the powertrain, reducing hydraulic requirements, providing an associated increase in fuel economy, and reducing overall vehicle cost. The transmission 15 includes a first motor/generator 18 and a second motor/generator 20. A plurality of intermeshing gears, such as one or more planetary gear sets, clutches and/or brakes, (not shown) may be connected with the motor/generators 18, 20 and with one another or the transmission housing in order to provide various operating modes and speed ratios between the input member 16 and an output member 22 of the transmission 15. For example, the transmission 15 may be a two-mode hybrid electromechanical transmission, providing two different electrically-variable operating modes and several fixed ratio modes by engaging the clutches and/or brakes in different combinations. One such operating mode is an electric-only operating mode, in which the engine 12 is off, and the motor/generators 18, 20 power the vehicle. The electric-only mode increases the fuel economy of the vehicle.

An engine control module (ECM) 24 is operatively connected with the engine 12 and with other vehicle components, such as an accelerator position sensor, a wheel speed sensor, etc., to control operation of the engine 12 (such as engine speed, starting or stopping) in accordance with a stored algorithm, as is typical. A hybrid control processor (HCP) 26 is operatively connected to the ECM 24 and to motor control processors (MCPA) 28 and (MCPB) 30 connected to the respective motor/generators 18, 20 to control electrical energy flow between the stators 32A, 32B of the motor/generators 18, 20 and a battery (not shown) to control whether the motor/generators function as motors or generators and the amount of torque and speed of the rotors 34A, 34B, thereof, as is well understood by those skilled in the art. MCPA 28 and MCPB 30 are connected with motor resolvers 36A, 36B, respectively, that indicate the speed, direction of rotation, and position of the respective rotors 34A, 34B and provide this information to the respective processors MCPA 28 and MCPB 30.

When operating conditions warrant, such as when additional torque is needed to meet driver demand than is available in the electric-only mode, the ECM 24 will restart the engine 12. The powertrain 10 utilizes an engine starting control apparatus 37 that includes the MCP 26, MCPA 28 and MCPB 30, as well as a torque pulse cancellation system 38, in order to prevent undesirable engine torque pulses from carrying through the open damper 17 to the transmission 15. Without torque pulse cancellation, the damper 17 would transmit torque pulses, as its natural frequency is typically encountered during ramping of engine speed at start.

The torque pulse cancellation system 38 includes a bi-directional rotational position sensing system 40 that is able to track both crankshaft speed and direction of rotation, from which algorithms stored in the HCP 26 associate an expected cylinder pressure and estimated torque pulse, as discussed further below. The sensing system 40 includes a bi-directional sensing element 42, also referred to herein as a crankshaft position sensor (CPS), mounted in a stationary position to ground 44, such as the engine case, and positioned proximate to a rotating element, such as a toothed wheel 46 that is mounted to rotate with the crankshaft 13. As may be seen in FIG. 1B, the toothed wheel 46 has a plurality of teeth 47, which in this embodiment is a total of 58 teeth, with two circumferentially spaced features that are gaps 48A, 48B between adjacent teeth substantially equivalent to the size of a tooth. The sensing element 42 is able to determine and track the rotation of each tooth past the element 42, as well as the rotation of the gaps 48A, 48B past the element 42, and the direction of rotation, and in this way monitor the speed and position of the crankshaft 13 and direction of rotation of the crankshaft 13 to within six degrees of accuracy. The sensing element 42 may be a Hall Effect or digital sensor, but is not limited to such. As the metal teeth 47 move past the sensing element 42, the magnetic field of the sensing element 42 is disturbed. This causes the sensing element 42 to produce an ON/OFF DC output voltage of varying frequency proportional to crankshaft rotation speed. The sensor is able to detect when the gaps 48A, 48B rotate past. The ECM 24 and HCP 26 can calculate the speed of the engine 12 from the frequency of pulses of sensing element 42. The accuracy of estimated engine position increases as the number of teeth 47 on the toothed wheel 46 increases.

The sensing element 42 sends a position signal 45 indicative of crankshaft direction of rotation, position and speed of rotation to both the HCP 26 and the engine 12. The engine 12 processes the position signal 45 for valve timing and other uses. The engine position signal is used by the HCP 26, and compared with data stored on the HCP 26 regarding the engine position and direction of rotation during the previous engine shutdown (autostop). Thus, the HCP 26 has an algorithm that tracks the engine position and maintains synchronization during autostops. Accordingly, the HCP 26 continuously monitors engine position, and is not subject to a delay in information as the spaced gaps 48A, 48B need only rotate past the sensor 42 once before the sensor 42 can provide a reliable signal 45, given the stored engine starting position data from before the autostop. The HCP 26 and ECM 24 do not require rotation of the missing pole area (gaps 48A, 48B) past the bi-directional crank sensing element 42 after autostop for reliable tooth position as long as power is maintained to the bi-directional sensing element 42. Furthermore, the HCP 26 tracks the time that the engine 12 is shutdown during an autostop, as well as temperature information, which may be provided by a coolant temperature sensor shown schematically as sensor 49, or by another temperature sensor on the engine 12. The temperature sensor 49 sends a temperature signal along an electrical connection (not shown) to the HCP 26. From this information, the HCP 26 calculates a corrected engine position that accounts for known inaccuracies of the sensing element 42 (i.e., position drift) during relatively long duration engine stops. The sensor inaccuracies may be predetermined, by lab testing at various temperatures for various durations.

Figures 1B, 1C:
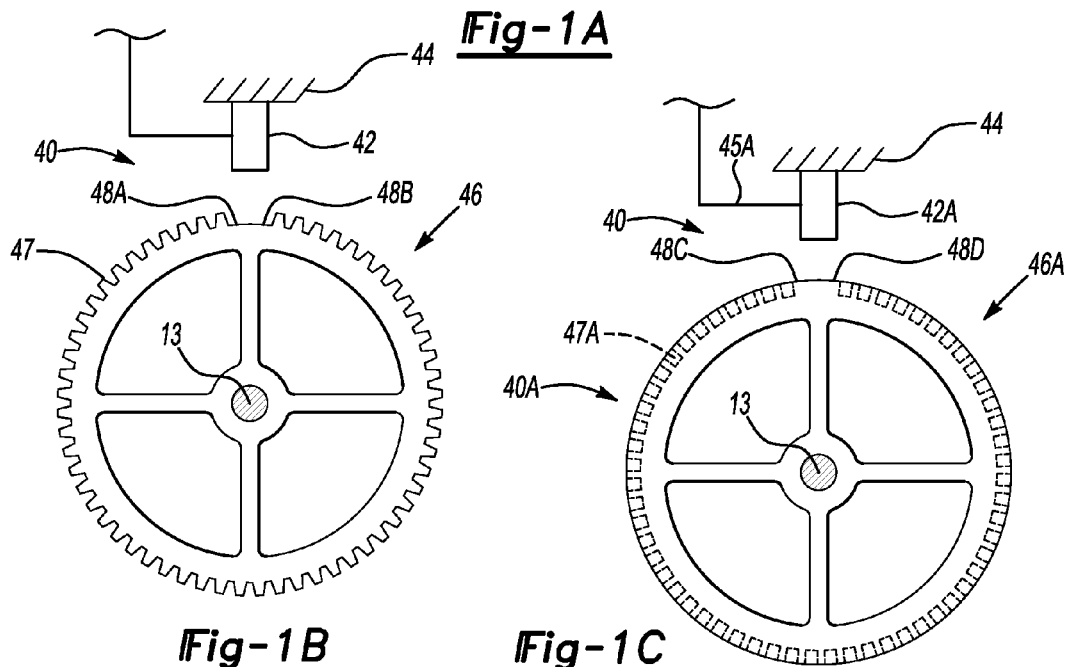
FIG. 1B is a front view of a bi-directional rotational position sensing system of the powertrain of FIG. 1A.
FIG. 1C is a front view of an alternate bi-directional rotational position sensing system for use in the powertrain of FIG. 1A.

An alternate bi-directional rotational position sensing system 40A is shown in FIG. 1C. Instead of a toothed wheel, the rotatable element is a magnetic encoder 46A with a total of 58 magnetic poles 47A and two missing adjacent magnetic poles creating adjacent gaps 48C, 48D. A sensing element 42A, also referred to herein as a CPS, is configured to track the rotation of each magnetic pole 47A, as well as the gaps 48C, 48D, past the element 42A. The sensing element 42A is also configured to determine the direction of rotation of the magnetic encoder 46A, and in this way monitor direction of rotation of the crankshaft 13, and the speed and position of the crankshaft 13 to within six degrees of accuracy, and send a position signal 45A indicative of crankshaft position and direction of rotation to both the HCP 26 and engine 12.

Additional information is stored on the HCP 26 as to the expected engine torque pulse associated with each position of the crankshaft 13. Expected engine torque pulse information may be based on torque pulses recorded when like powertrains (without a torque pulse cancellation system) are tested for performance or may be based on mathematical models. The MCPA 28 and MCPB 30 track the motor/generator positions and speeds with the resolvers 36A, 36B, and provide this information to the HCP 26. From the engine rotational position and direction information of the sensing element 42 and the motor speed and position information from the resolvers 36A, 36B, the HCP 26 generates an engine torque pulse cancellation torque, configured to cancel the expected engine torque pulse, and send a torque command to MCPA 28 and MCPB 30, to thereby control operation of the motor/generators 18, 20 to counteract and cancel the engine torque pulse while still meeting required torque at the output member 22 to meet driver commands under given vehicle operating conditions.

Second Embodiment

Referring to FIGS. 2A, 2B a hybrid powertrain 110 is illustrated. Components identical to those shown and described with respect to FIG. 1A and 1B have like references numbers. The engine 112 has six cylinders 114 moving crankshaft 13, although any number of cylinders may be used. The hybrid powertrain 110 has an engine starting control apparatus 137, that includes ECM 124, HCP 126, MCPA 28 and MCPB 30, as well as a torque pulse cancellation system 138 that utilizes a bi-directional rotational position sensing system 140 with bi-directional sensing element 42 in addition to a unidirectional sensing element 43, spaced angularly by a predetermined amount W from the element 42, and also positioned to generate a position signal 147 based on rotation of wheel 46, sending the position signal to the ECM 124 for processing. The sensing elements 42, 43 are also referred to herein as CPSs. The ECM 124 determines an engine position according to the unidirectional sensing element 43 for use in controlling the engine 112. The signal 147 is also provided to the HCP 126, which duplicates the processing of signal 147 performed by the ECM 124, also processes the signal 45 provided by the bi-directional sensing element 42, and uses the processed signal information in an algorithm to calculate engine position to within three degrees of accuracy based on the signals 45, 147 from the two offset sensing elements 42, 43. In an alternate embodiment, the unidirectional sensing element 43 could be replaced by another bi-directional sensing element, so that two bi-directional sensing elements are used, thus improving overall system accuracy.

An alternate bi-directional rotational position sensing system 140A is shown in FIG. 2C. Instead of a toothed wheel, the rotatable element is the magnetic encoder 46A described with respect to FIG. 1C. The sensing element 42A is also configured to determine the direction of rotation of the magnetic encoder 46A, and in this way monitor speed, position, and direction of rotation of the crankshaft 13, and send a position signal 45A indicative of crankshaft position and direction of rotation to the HCP 26. A unidirectional sensing element 43A is spaced angularly by amount W from sensing element 42A and generates position signal 147A which is sent to the ECM 124 for processing, and is also sent to the HCP 126, which duplicates the processing of signal 147A performed by the ECM 124. The HCP 126 also processes the signal 45A provided by the bi-directional sensing element 42A, and uses the processed signal information in an algorithm to calculate engine position to within three degrees of accuracy based on the signals 45A, 147A from the two offset sensing elements 42A, 43A. In an alternate embodiment, the unidirectional sensing element 43A could be replaced by another bi-directional sensing element, so that two bi-directional sensing elements are used, thus improving overall system accuracy.

Like HCP 26, HCP 126 also has an algorithm to track engine position prior to the shutdown, and thereby maintain synchronization of engine position information during the autostop and upon engine starting. Furthermore the HCP 126 has an algorithm to generate an engine torque pulse cancellation command, based on the engine position information, to thereby control the motor/generators 18, 20 to cancel the torque pulse that would otherwise flow through the open damper 17. An algorithm to correct the engine position calculation to account for temperature related position drift of the sensing elements 42, 43 (or 42A, 43A) during long duration engine stops is also provided.

Third Embodiment

Referring to FIGS. 3A, 3B a hybrid powertrain 210 is illustrated. Components identical to those shown and described with respect to FIGS. 1A and 1B have like references numbers. The engine 212 has six cylinders 214 moving crankshaft 13, although an engine with any number of cylinders may used. The hybrid powertrain 210 has an engine starting control apparatus 237, that includes the HCP 226, and MCPA 28 and MCPB 30, as well as torque pulse cancellation system 238 that utilizes a bi-directional rotational position sensing system 240 with a bi-directional sensing element 242, also referred to herein as a CPS, mounted to determine rotational position of a toothed wheel 246 mounted on an input side of the damper 17. The input side of the damper 17 rotates commonly with the crankshaft 13, and is therefore indicative of the crankshaft position. The toothed wheel 246 preferably has 118 teeth 249 along with two spaced features 248A, 248B substantially the size of two of the teeth 249 that are adjacent one another. The torque pulse cancellation system 238 also utilizes a unidirectional rotational position sensing system with the unidirectional sensing element 43 and toothed wheel 46 mounted on crankshaft 13, as described with respect to FIGS. 2A and 2B. Sensing element 43 is positioned to generate a position signal 147 based on rotation of wheel 46, sending the position signal to the ECM 124 for processing. One advantage to having two rotating elements, such as toothed wheels 46, 246, is that they may be of different resolutions (tooth counts or number of magnetic poles) in order to improve overall accuracy, The ECM 124 determines an engine position according to the unidirectional sensing element 43 for use in controlling the engine 212. A signal 245 provided by the bi-directional sensing element 242 is also provided to the HCP 226, which processes signal 245 in an algorithm to calculate engine position to within 3 degrees based on the position of the crankshaft 13 as determined by the sensing element 242 and toothed wheel 246.

An alternate bi-directional rotational position sensing system 240A is shown in FIG. 3C. Instead of a toothed wheel, the rotatable element is a magnetic encoder 246A with 118 magnetic poles 247A with two missing adjacent magnetic poles creating adjacent gaps 248C, 248D. The sensing element 242A is configured to track the rotation of each magnetic pole 247A, as well as the gaps 248C, 248D, past the element 242A. The sensing element 242A is also configured to determine the direction of rotation of the magnetic encoder 246A, and in this way monitor direction of rotation of the crankshaft 13, and the speed and position of the crankshaft 13 to within three degrees of accuracy, and send a position signal 245A to the HCP 226, which processes signal 245A in an algorithm to calculate engine position to within three degrees of accuracy based on the position of the crankshaft 13 as determined by the sensing element 242A and magnetic encoder 246A.

Like HCP 26, HCP 226 also has an algorithm to track engine position prior to the shutdown, and thereby maintain synchronization of engine position information during the autostop and upon engine starting. Furthermore the HCP 226 has an algorithm to generate an engine torque pulse cancellation command, based on the engine position information, to thereby control the motor/generators 18, 20 to cancel the torque pulse that would otherwise flow through the open damper 17. An algorithm to correct the engine position calculation to account for temperature related position drift of the sensing elements 242, 43 (or 242A, 43) during long duration engine stops is also provided.

Figure 4:
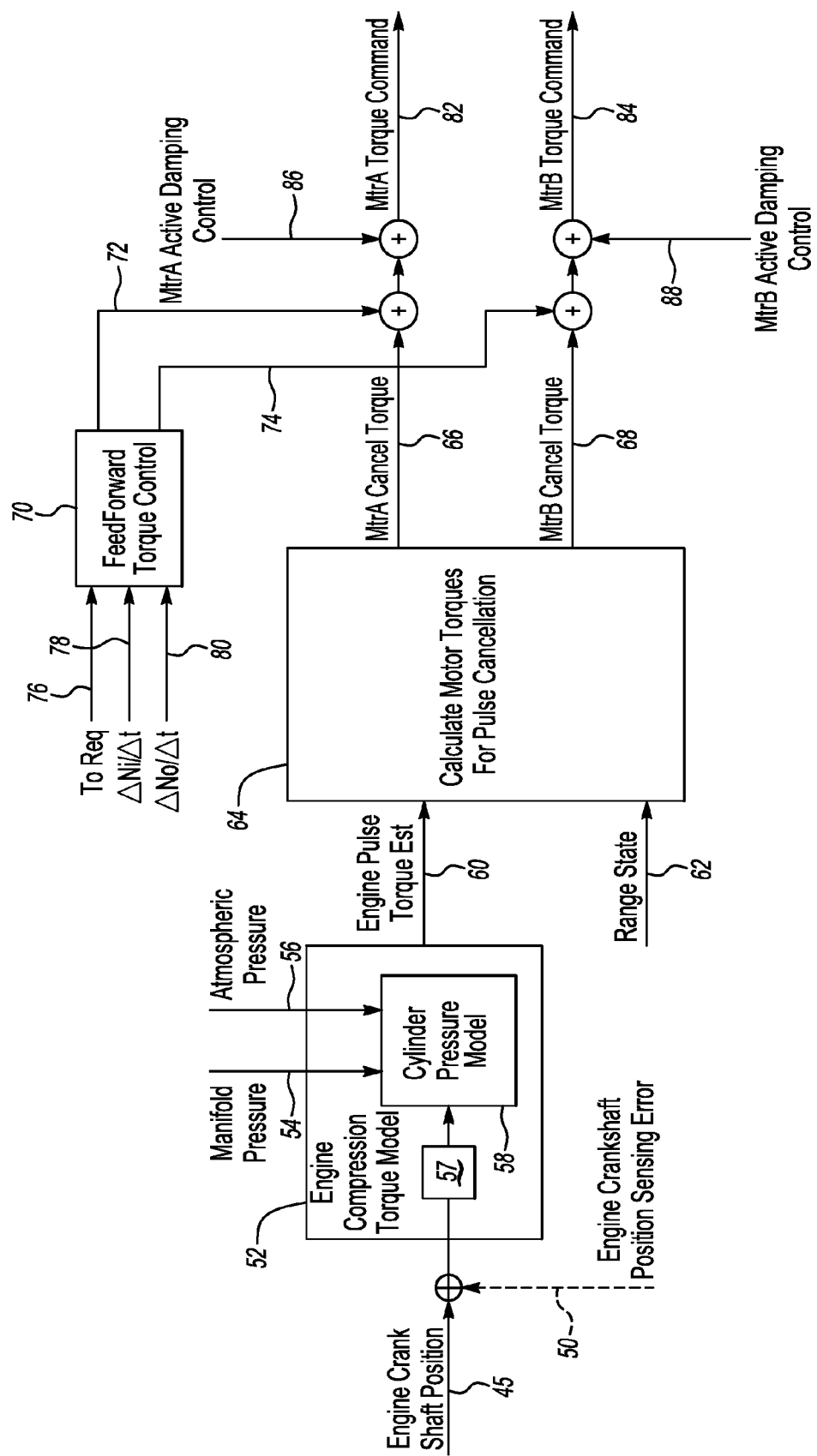
FIG. 4 is a schematic representation of controllers within the hybrid powertrains of FIGS. 1A-3A, indicating a method of generating motor torque commands to cancel expected engine torque pulses based on rotational position of the crankshaft and/or the damper.

Referring to FIG. 4, the algorithms carried out by the HCP 26 are illustrated schematically. Although the algorithms are described with respect to the HCP 26 of powertrain 10 of FIG. 1A, they apply to powertrains 110 and 210 as well. First, the engine crankshaft position signal 45 and, optionally, temperature data and time duration of a previous autostop, indicated as data 50, are provided to an algorithm or model 52 of engine torque compression. The model 52 also takes into account engine manifold pressure information 54 and atmospheric pressure information 56 to generate an expected cylinder pressure in a cylinder pressure model 58. Stored information 57 regarding engine position prior to engine shutoff, as well as a duration of shutoff is also considered in estimating engine position and resulting cylinder pressure. Based on the cylinder pressure model 58, an estimated engine torque pulse 60 is generated, representing the expected torque pulse that would be caused by starting the engine 12 with the crankshaft 13 in the position indicated under the given pressure and temperature conditions. A person of ordinary skill in the art of engine design would understand the relationship between crankshaft position, manifold pressure, cylinder pressure and expected torque pulse and be able to develop an algorithm 52.

Next, an algorithm 64 calculates the torque of motor/generators 18, 20 necessary to cancel the estimated engine torque pulse 60, taking into account the operating mode 62 of the powertrain 10 once the engine is started (e.g., whether the powertrain 10 will be in a first or a second electrically variable operating mode, assuming the powertrain has two electrically variable operating modes). The algorithm 64 thus provides a cancellation torque 66 required for the first motor/generator 18 and a cancellation torque 68 required for the second motor/generator 20.

Next, a torque control algorithm 70 provides a torque 72 for motor/generator 18 and a torque 74 for motor/generator 20 that is based on torque required 76 at the output member 22 to meet vehicle operating conditions, a measurement of angular acceleration 78 of the input member 16, and a measurement of angular acceleration 80 of the transmission output member 22. The required motor torques 72 and 74, modified by any cancellation torques necessary for the respective motor/generators 18, 20, as indicated by calculated cancellation torques 66, 68 provide a resulting commanded torque 82 for motor/generator 18 and a commanded torque 84 for motor/generator 20. Optionally, additional active damping control of the motor/generators 18, 20 may be provided that feeds actual vehicle speed to the HCM 26, and uses it to determine the desired speed profile of engine 12 and motor/generators 18, 20, and compare these to actual engine speed and motor/generator speeds. From this, motor torque adjustments 86, 88 are calculated and provide additional damping to supplement the damping effects in the driveline to attenuate high frequency oscillation from output member 22 to the wheel, thus further refining motor torques 82, 84.

Figure 5:
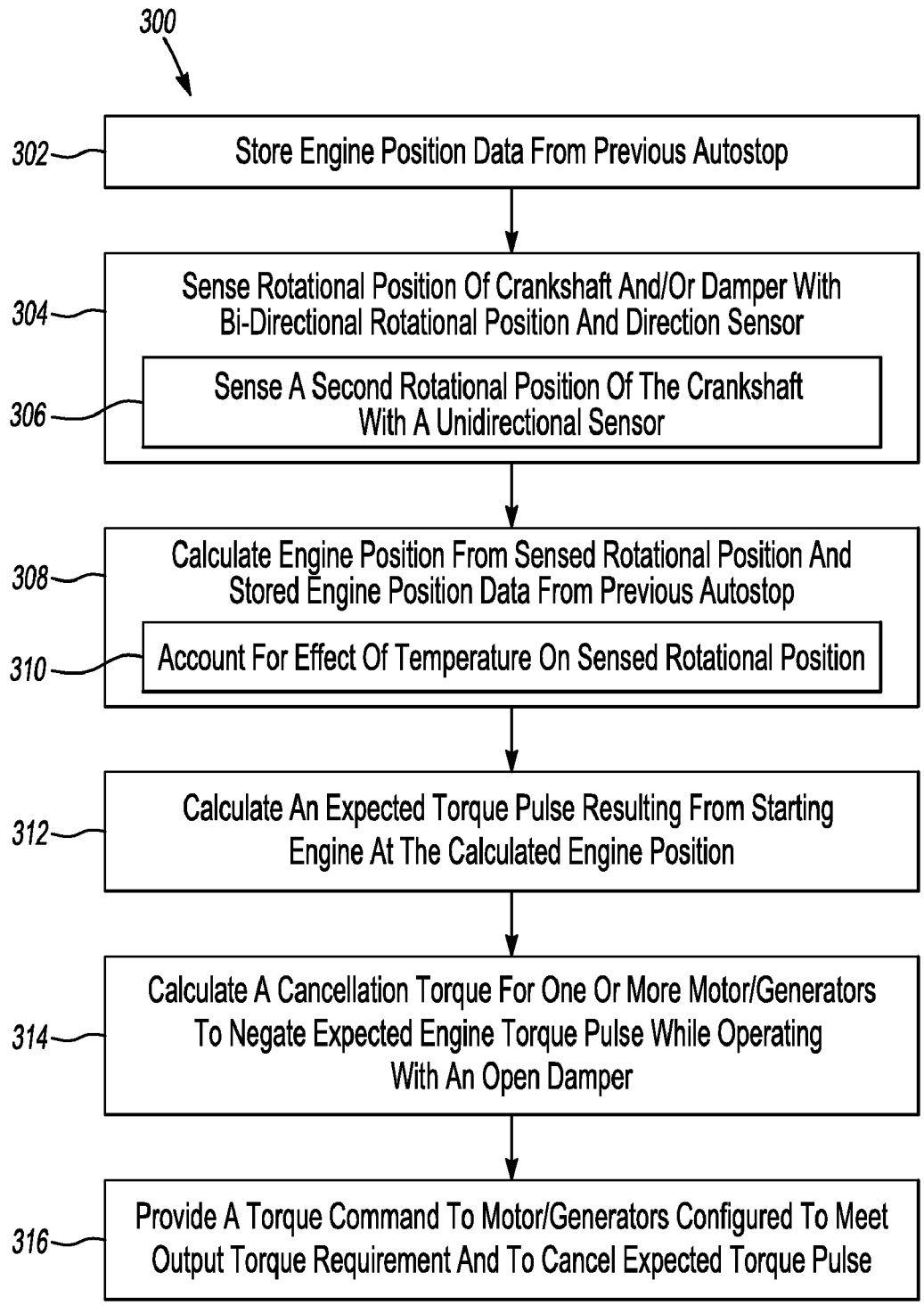
FIG. 5 is a flowchart of a method of controlling the hybrid powertrains of FIGS. 1A-3A.

Referring to FIG. 5, a flowchart of a method 300 of controlling a hybrid powertrain, and specifically of controlling engine torque pulses during an autostart, is described with respect to powertrain 10 of FIG. 1A, but applies equally to powertrains 110 and 210 as well. The method 300 includes step 302, storing engine position data from the previous autostop, for use by the HCP 26 in determining engine position at the autostart, given that the bi-directional sensing element 42 indicates direction of rotation as well as rotational position, as described above.

Next, in step 304, the rotational position of the crankshaft and/or the damper is sensed using the bi-directional sensing element 42, and a corresponding sensor signal is conveyed to the HCP 126. In some embodiments, such as powertrain 110 of FIG. 2A, a unidirectional sensing element 43 is also provided, and senses engine rotational position and conveys a corresponding sensor signal in step 306.

In step 308, engine position is calculated from the sensed rotational position of the bi-directional sensing element 42, from the unidirectional sensing element 43 in the embodiment of FIG. 2A. Optionally, in sub step 310 of step 308, the engine position calculation may account for the effect of temperature on the accuracy of the sensing element over relatively long autostop duration.

With the calculated engine position based at least in part on the information provided by the bi-directional rotational position sensing element 42, an expected engine torque pulse 60 associated with engine starting with the crankshaft 13 at the calculated engine position is determined in step 312. Based on the expected torque pulse, cancellation torques 66, 68 are calculated in step 314 for the motor/generators 18, 20 that will negate the calculated torque pulse. Finally, in step 316, torque commands 82, 84 are provided to the motor/generators 18, 20 that consider required output torque, torque pulse cancellation torques, and, optionally, active damping control of the motor/generators 18, 20 as described with respect to FIG. 4, and enable the powertrain 10 to counteract torque pulses during engine autostart with an open damper 17.

While the best modes for carrying out the invention have been described in detail, those familiar with the art to which this invention relates will recognize various alternative designs and embodiments for practicing the invention within the scope of the appended claims.

The invention claimed is:

1. A hybrid powertrain comprising:
   an engine having a crankshaft;
   a hybrid transmission having an input member, an output member, and at least one motor/generator operable to provide or receive torque;
   a damper connecting the crankshaft with the input member;
   a bi-directional rotational position sensing system operatively connected with the crankshaft, and configured to sense the rotational position and direction of the crankshaft and provide a position signal indicative thereof; and
   at least one controller configured to receive the position signal and to provide a torque command to the motor/generator based at least in part on the position signal and operable to cause the motor/generator to substantially cancel an expected engine torque pulse associated with the sensed rotational position during starting of the engine with the damper open.

2. The hybrid powertrain of claim 1, wherein the powertrain is characterized by the absence of a bypass clutch for the damper.

3. The hybrid powertrain of claim 1, wherein the bi-directional position sensing system includes a rotating element mounted to said one of the crankshaft and an input side of the damper and a bi-directional rotational position sensing element positioned proximate the rotating element; wherein the rotating element is characterized by circumferentially spaced features sufficiently sized to be sensed by the bi-directional rotational position sensing element when rotating past the bi-directional rotational position sensing element.

4. The hybrid powertrain of claim 3, wherein the rotating element is a toothed wheel; and wherein the features are a first gap and a second gap between adjacent teeth, the gaps being spaced adjacent one another on the toothed wheel.

5. The hybrid powertrain of claim 3, wherein the rotating element is a magnetic encoder having magnetic poles spaced circumferentially therearound; and wherein the features are a first gap and a second gap between adjacent magnetic poles, the gaps being spaced adjacent one another on the magnetic encoder.

6. The hybrid powertrain of claim 3, further comprising:
a unidirectional rotational position sensing element angularly spaced from the bi-directional rotational position sensing element and operable to sense the features rotating past the unidirectional rotational position sensing element; wherein the unidirectional rotational position sensing element is not configured to sense direction of rotation of the rotating element; wherein the unidirectional rotational position sensing element is operable to provide another position signal to the at least one controller; and wherein the torque command is further based in part on the position signal provided by the unidirectional rotational position sensing element.

7. The hybrid powertrain of claim 3, wherein the rotating element is a first rotating element mounted to the damper; and further comprising:
a second rotating element mounted to the crankshaft;
a unidirectional rotational position sensing element positioned proximate the second rotating element; wherein the second rotating element is characterized by circumferentially spaced features sufficiently sized to be sensed by the unidirectional rotational position sensing element when rotating past the unidirectional rotational position sensing element;
wherein the unidirectional rotational position sensing element is operable to provide another position signal to the controller; and wherein the torque command is further based in part on the position signal provided by the unidirectional rotational position sensing element.

8. The hybrid powertrain of claim 1, further comprising:
a temperature sensor operatively connected to the powertrain and configured to provide a signal indicative of sensed temperature to the at least one controller; and
wherein the at least one controller is configured to adjust the torque command based on a predetermined relationship between temperature and the position signal.

9. The hybrid powertrain of claim 1, wherein the at least one controller includes an engine controller for controlling engine speed, a hybrid controller configured to process the position signal, and a motor controller; and further comprising:
a motor resolver configured to determine speed of the motor/generator and to provide a sensor signal indicative thereof to the motor controller.

10. The hybrid powertrain of claim 1, wherein the bi-directional sensing system and the controller are configured to determine the crankshaft position to within 6 degrees.

11. The hybrid powertrain of claim 1, wherein the bi-directional sensing system and the controller are configured to determine the crankshaft position to within 3 degrees.

12. A method for controlling a hybrid powertrain having an engine with a crankshaft, a transmission with an input member and an output member, and at least one motor/generator operable to provide or receive torque, comprising:
sensing the rotational position and direction of the engine crankshaft with a bi-directional rotational position sensing element; wherein a damper connects the engine crankshaft to the input member of the transmission; wherein the powertrain is characterized by the absence of a bypass clutch for the damper; and
providing a torque command to the at least one motor/generator that is configured to cancel an expected engine torque pulse occurring during starting of the engine; wherein the expected engine torque pulse is based on the sensed rotational position and direction.

13. The method of claim 12, further comprising:
sensing a second rotational position of the crankshaft via a unidirectional rotational position sensing element; wherein the expected engine torque pulse is further based on the sensed second rotational position.

14. The method of claim 13, wherein the expected engine torque pulse is further based on engine manifold pressure.

15. The method of claim 12, wherein the expected engine torque pulse is further based on an expected deviation in sensed rotational position due to temperature.

16. The method of claim 12, wherein the controller stores rotational position data; and wherein the expected engine torque pulse is further based on a final rotational position at an engine shutdown prior to the starting of the engine.

* * * * *